US012572759B2

(12) United States Patent
Barry et al.

(10) Patent No.: US 12,572,759 B2
(45) Date of Patent: Mar. 10, 2026

(54) MULTILINGUAL CONVERSATION TOOL

(71) Applicant: Cabo Applications LLC, Blacksburg, VA (US)

(72) Inventors: Michael John Barry, Blacksburg, VA (US); Beena Jacob, Albuquerque, NM (US)

(73) Assignee: Cabo Applications LLC, Blacksburg, VA (US)

( * ) Notice: Subject to any disclaimer, the term of this patent is extended or adjusted under 35 U.S.C. 154(b) by 381 days.

(21) Appl. No.: 18/014,217

(22) PCT Filed: Jun. 29, 2021

(86) PCT No.: PCT/US2021/039495
§ 371 (c)(1),
(2) Date: Jan. 3, 2023

(87) PCT Pub. No.: WO2022/006034
PCT Pub. Date: Jan. 6, 2022

(65) Prior Publication Data

US 2023/0259719 A1 Aug. 17, 2023

Related U.S. Application Data

(60) Provisional application No. 63/047,324, filed on Jul. 2, 2020.

(51) Int. Cl.
*G06F 40/51* (2020.01)
*G06F 40/58* (2020.01)

(52) U.S. Cl.
CPC .............. *G06F 40/58* (2020.01); *G06F 40/51* (2020.01)

(58) Field of Classification Search
CPC ................................. G06F 40/58; G06F 40/51
See application file for complete search history.

(56) References Cited

U.S. PATENT DOCUMENTS 9,183,199 B2 * 11/2015 Wu ......................... G06F 40/58
2008/0208565 A1 * 8/2008 Bisegna .................. G06F 40/40 704/4

(Continued)

FOREIGN PATENT DOCUMENTS

CN 106445490 2/2017

OTHER PUBLICATIONS

Intellectual Propery India, First Examination Report for parallel application 174913.38, Jul. 26, 2023.

(Continued)

*Primary Examiner* — Bryan S Blankenagel
(74) *Attorney, Agent, or Firm* — Craig Fieschko; DeWitt LLP

(57) ABSTRACT

A user's computing device (such as a smartphone) runs an application whereby the user can connect with nearby bystanders who may speak different languages. Upon establishing a connection with the bystander, the user can enter a message in the user's primary language. The message is translated to the primary languages of the bystanders, and each such translated message is also back-translated into the user's primary language for review and editing. The back-translated message(s) allow the user to discern possible issues with the original message that may cause misunderstandings with the bystanders. Subsequent editing of the original and/or back-translated messages results in updates to all of the original, translated, and back-translated messages, and upon the user's approval, the translated messages are sent to the bystanders, who may respond via their devices in the same manner as the user.

20 Claims, 8 Drawing Sheets

(56) References Cited

U.S. PATENT DOCUMENTS

| | | | | |
|---|---|---|---|---|
| 2009/0204386 | A1* | 8/2009 | Seligman | G06F 40/58 704/2 |
| 2009/0313005 | A1* | 12/2009 | Jaquinta | G06F 40/58 704/2 |
| 2010/0274552 | A1 | 10/2010 | Gao | |
| 2012/0209588 | A1 | 8/2012 | Wu | |
| 2012/0253784 | A1* | 10/2012 | Maskey | G06F 40/58 704/E11.001 |
| 2013/0012173 | A1 | 1/2013 | Sigmund | |
| 2013/0012175 | A1 | 1/2013 | Butterfield | |
| 2013/0036180 | A1 | 2/2013 | Deren et al. | |
| 2014/0288915 | A1* | 9/2014 | Madnani | G06F 40/58 704/2 |
| 2016/0147738 | A1 | 5/2016 | Geurts | |
| 2017/0053189 | A1* | 2/2017 | Koch | G06F 16/5866 |
| 2018/0070208 | A1* | 3/2018 | Alharayeri | H04L 67/306 |
| 2018/0276202 | A1 | 9/2018 | Baek et al. | |
| 2019/0018842 | A1* | 1/2019 | Nomura | G06F 40/58 |

OTHER PUBLICATIONS

International Search Report and Written Opinion dated Oct. 4, 2021 from PCT Application US2021/039495.

Matsuda et al., Multilingual speech-to-speech translation system: VoiceTra, Jun. 2013, IEEE 14$^{th}$ International Conference on Mobile Data Management., ResearchGate.

* cited by examiner

Can I borrow your book — 506

↓

TRANSLATION ENGINE 1 (English to Italian) — 508

↓

Posso prendere in prestito il tou libro — 510

↓

TRANSLATION ENGINE 2 (Italian to English) — 512

↓

I can borrow your book — 514

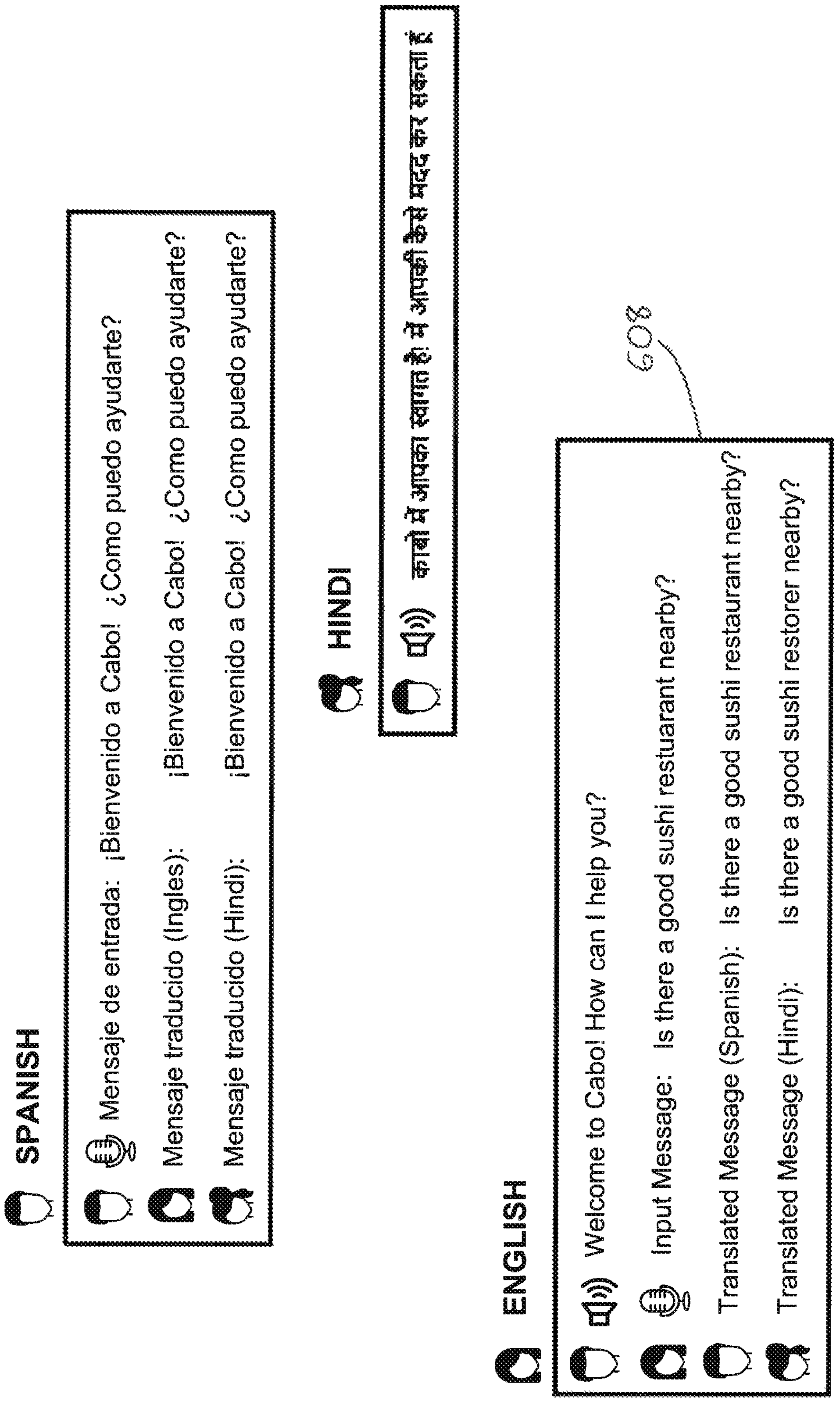

*Fig. 6b*

SPANISH

Mensaje de entrada: ¡Bienvenido a Cabo! ¿Como puedo ayudarte?

Mensaje traducido (Ingles): ¡Bienvenido a Cabo! ¿Como puedo ayudarte?

Mensaje traducido (Hindi): ¡Bienvenido a Cabo! ¿Como puedo ayudarte?

HINDI

काबो में आपका स्वागत है। मैं आपकी कैसे मदद कर सकता हूँ?

ENGLISH

Welcome to Cabo! How can I help you?

Input Message: Is there a good sushi restuarant nearby?

Translated Message (Spanish): Is there a good sushi restaurant nearby?

Translated Message (Hindi): Is there a good sushi restorer nearby?

608

MULTILINGUAL CONVERSATION TOOL

FIELD OF THE INVENTION

This document concerns an invention relating generally to interpersonal communication devices and methods, and more specifically to devices and methods for enabling multilingual conversations.

BACKGROUND OF THE INVENTION

Travelers and others would often benefit from the ability to readily communicate with others who do not speak their language. Handheld electronic translators exist wherein input statements (entered by text or voice) are translated to other languages, but these pose difficulties when the user does not know the language of the person with whom the user wishes to communicate (as the user does not know which output language to select). These translators additionally tend to have translation imperfections due to context, idiomatic expressions, multiple word meanings, and other challenges. The difficulties posed by language barriers are compounded by the awkwardness of making introductions with others who may have different cultural standards, and/or who may simply not be receptive to communicating with someone who does not speak their language (whether owing to shyness, the desire to avoid potential frustrations, nationalism/xenophobia, or other reasons). Many existing handheld translators require that the parties engaged in communication be in close proximity, and/or require sharing and transmission of potentially sensitive personal information such as mobile phone numbers, email addresses, user names, device information, etc., raising privacy and information security concerns.

SUMMARY OF THE INVENTION

The invention, which is defined by the claims set forth at the end of this document, is directed to methods and devices which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

The invention allows a user to communicate with one or more bystanders who may not know the user's language using a computing device, preferably a mobile computing device such as a smartphone. The invention can then take the form of a program ("app") running on the user's smartphone and the smartphones of bystanders, with the processes described below occurring as the app is running. It should be understood that for sake of clarity, the term "user" is used to refer to any particular user, with the term "bystander" referring to other nearby users. Thus, each bystander is also a "user" from the perspective of that bystander, and each user is also a "bystander" from the perspective of other users.

The user creates a profile which is stored by the app, with the profile including information regarding the user's identity and preferred language for communication. As seen at FIG. 1 at 104, while the app is running, the user can indicate his/her communication status as "available" (i.e., seeking communication with, or being willing to communicate with, others) or as "unavailable." When the user's communication status is set to available, an introductory data packet is transmitted (at 106) from the user's device to nearby bystanders via a suitable short-range wireless transmission protocol (e.g., Bluetooth) that can be accommodated by the user's device. The introductory data packet includes a packet header (a unique identifier corresponding to the user's device, and thus corresponds to the user), and a payload including at least some of the profile information regarding the user's identity (preferably including at least an image of the user and the user's preferred language). The introductory data packet is received by, and at least partially displayed on, the devices of the nearby bystanders running the app (at 108). Thus, for example, at an airport where an "available" user is running the app, bystanders within the user's transmission range might see on their devices an image of the user and the user's preferred language (as exemplified by FIG. 4). This allows each bystander to visually identify the user nearby, and verbally communicate with the user if the bystander knows the user's preferred language. Otherwise, a bystander may communicate with the user via use of the app on the bystander's device as described below. The user likewise receives the introductory data packets of any nearby "available" bystanders (at 110 in FIG. 1), with his/her device at least partially displaying the content of the bystanders' introductory data packets, indicating that these bystanders are available for communications.

Once the user sees the nearby bystanders on his/her device, the user can select one or more bystanders with whom the user wishes to communicate, as by pressing the image/icon/listing for the chosen bystander(s) on the screen of the user's device. Such selection sends a connection request (at 112) from the user's device to each selected bystander, i.e., a request to engage in further private communications with the selected bystander(s), with both the connection request and further communications being sent via the short-range wireless transmission protocol. The selected bystanders' devices then display the user's connection request (as by highlighting or otherwise altering the appearance of the user's image/icon/listing), and allow the selected bystanders to accept the connection request (at 114, as by pressing the user's image/icon/listing on the screen of the bystander's device). As seen at 116, any bystander can similarly select the user (or another bystander), thereby sending a connection request to the selected party for the recipient's possible acceptance.

Acceptance of a connection request establishes a connection between the bystander(s) and the user, enabling further communications (a "conversation" at 118) between the connected parties. Either the user or a bystander may initiate the conversation, with the following discussion assuming initiation by the user, though the same steps are performed when a bystander initiates a conversation. Referring to FIG. 2, the user inputs a user message on his/her device (at 202), with the user message being displayed on the screen of the user's device (at 206). The user message is then translated (at 208) into one or more translated user messages by use of a translation engine (discussed at greater length below), with each translated user message being in the preferred language of a respective one of the connected bystanders (and preferably also being displayed on the screen of the user's device, at 210). Each translated user message is then translated (at 212, via a different or the same translation engine) into a respective back-translated message in the user's preferred language, with the back-translated message being displayed on the screen of the user's device (at 214). The display of both the user message and the back-translated message(s) provides insight into the meaning that a bystander would understand from the translated user message. If it appears from the back-translated message that the intended meaning of the user message is not properly stated, the user may then edit one or more of the user message and the back-translated message (at 216). The edited message is then again translated and back-translated, with at least the back-translated message being displayed to the user. The user may then again edit one or more or the message and the back-translated message, with the steps of translation, back-translation, and editing occurring until the user is satisfied with the message. The user may then indicate his/her approval of the user message (as by pressing a "send" button on the user's display), at which point each of the translated user messages are transmitted to the devices of their respective bystanders, and are displayed in each of the bystanders' preferred language (at 220).

Further potential advantages, features, and objectives of the invention will be apparent from the remainder of this document in conjunction with the associated drawings.

BRIEF DESCRIPTION OF THE DRAWINGS

FIGS. 6*a*-6*c* illustrate steps in a conversation between Spanish, English, and Hindi-speaking users.

DETAILED DESCRIPTION OF EXEMPLARY VERSIONS OF THE INVENTION

The invention involves a method for enabling introductions and two-way conversations between people who speak different languages, with the method preferably being executed by an application running on smartphones, laptop computers, or other computing devices. The invention also involves devices allowing such introductions and conversations, i.e., a computing device executing the aforementioned app or otherwise enabling the aforementioned method. A user can connect with nearby users (bystanders) with whom the user has no prior familiarity. Users in close proximity to each other (e.g., within 100 meters), and who each have the app running on their devices, can connect and have a conversation (i.e., share one or more messages) without sharing their names, phone numbers, or other sensitive personal information.

When a user is running his/her application and sets his/her status within the application as "available" for conversations, the application has the user's device transmit an introduction (an introductory data packet) using any known wireless communication technology that supports point-to-point connectivity and transmission (for example, Bluetooth Low Energy, Zigbee, Ultra-Wideband, or another Wireless Personal Area Network (WPAN) protocol). The transmitted introductory data packet includes a packet header (a unique identifier corresponding to the user's device, and thus corresponds to the transmitting user), and a payload. The payload preferably includes an encrypted/encoded user profile, preferably including at least the user's preferred language for communications and an image of the user. If the user's application does not have an image available, and/or if the user's image is beyond some predefined age, the user's application may prompt the user to capture a new image of the user. This new image might be verified by facial recognition to correspond to the user, as by comparison with an image of the user captured when the user initially created his/her account. Here, the objective is to verify that the image presented in the introductory data packet actually corresponds to the user, and to prevent a user from transmitting an introductory data packet bearing an image of someone else, e.g., an image of someone else nearby. The user profile may optionally include other data such as the age of the image (e.g., the date the image was created), a user name, languages spoken, gender, age, profession (e.g., "student," "IT consultant," etc.), a brief description chosen by the user e.g., "business traveler." "vacationer," "local," "arts aficionado," "skier," etc.), and/or the user's preferred format for receipt of messages from other users (in text format, audio format, or both). Some of this information may be in audio format (e.g., as recorded by the user) in addition to, or instead of, text format.

Figure 3:
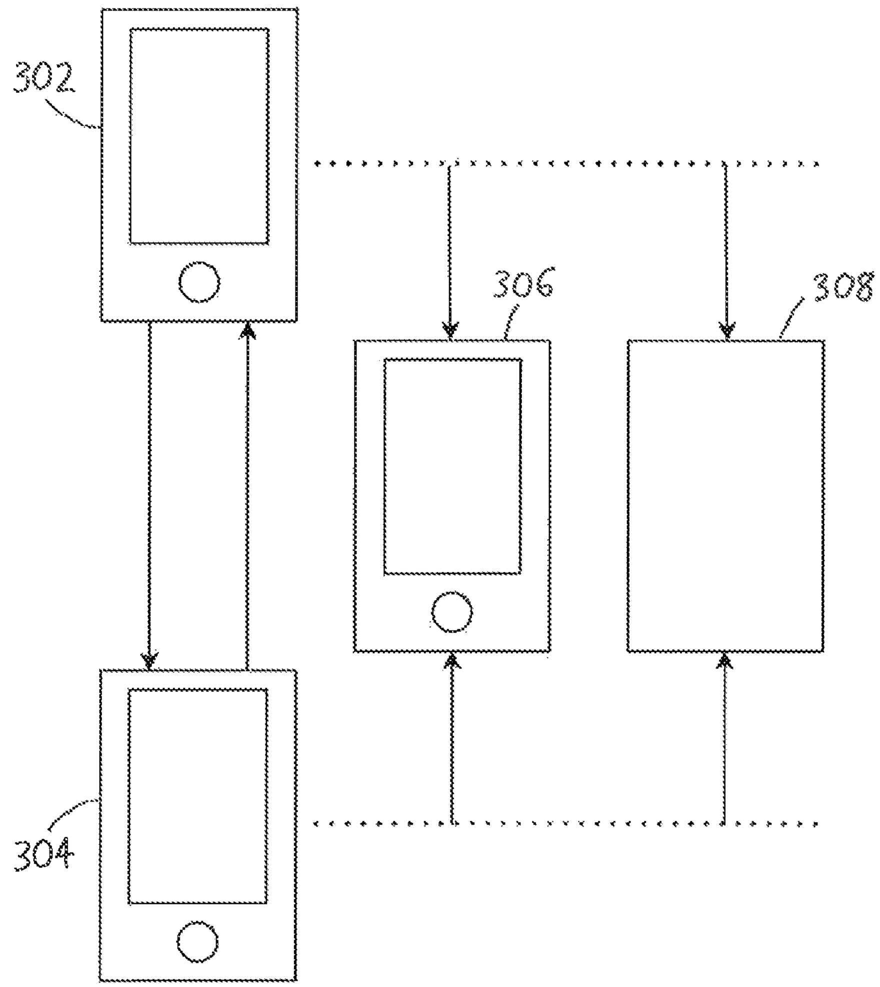
FIG. 3 is a schematic illustration of the process by which the computing devices of a user (at 302) and a bystander (at 304) make introductions.
Figure 4:
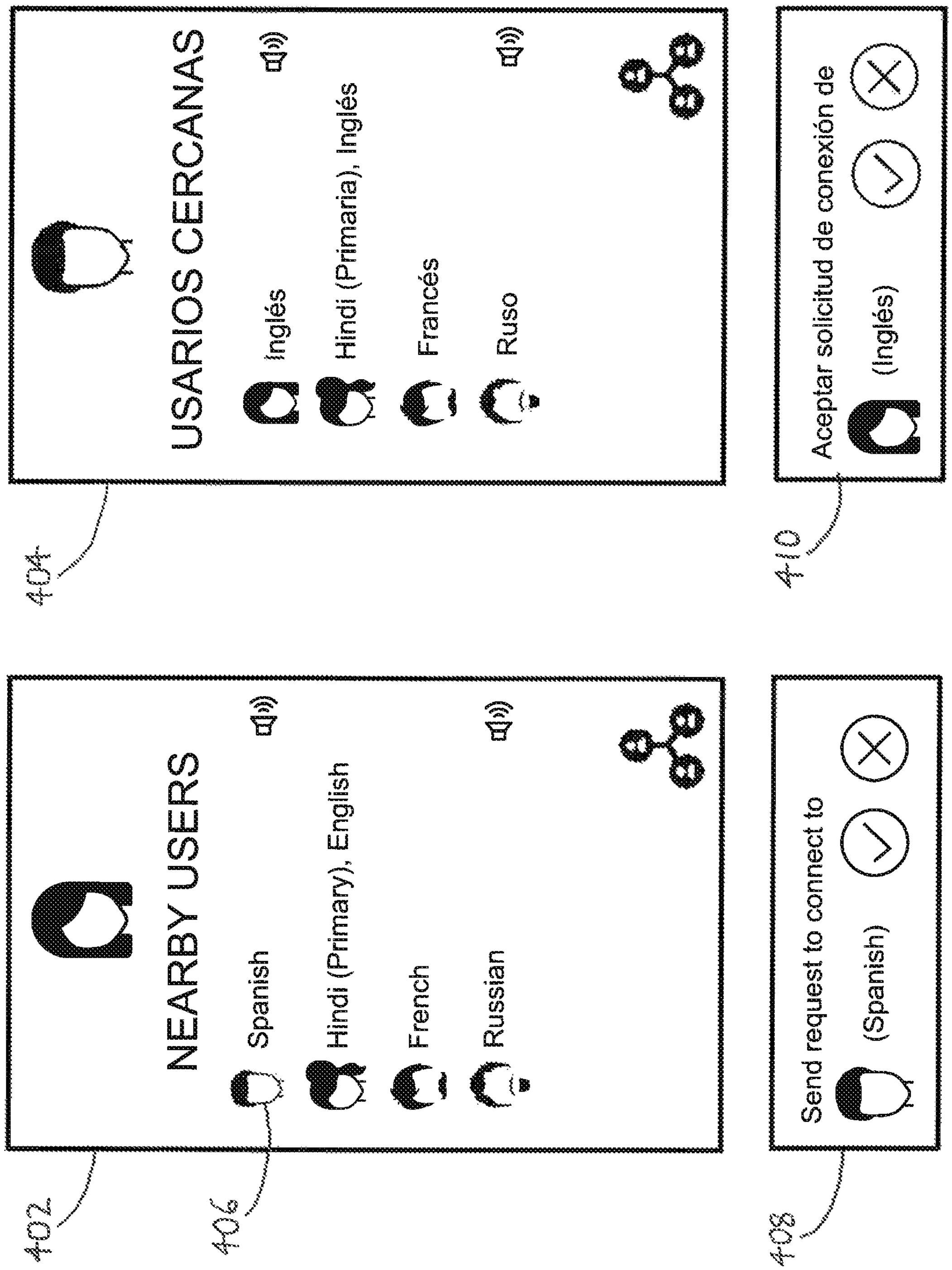
FIG. 4 depicts an exemplary device screen 402 of a user, showing nearby bystanders with whom the user can make a connection, and an exemplary device screen 404 of a bystander, showing the user and other bystanders with whom the bystander can make a connection.

An example is shown in the accompanying FIG. 3. The devices 302 and 304 of a first user and a second user are both running the app, with both transmitting their introductory data packets (introductions) at frequent intervals. Nearby devices within range are listening to (i.e., receiving) the transmitted introductory data packets, and thus the first user's device 302 is listening to the transmitted introductory data packet from the second user's device 304, and likewise the second user's device 304 is listening to the transmitted introductory data packet from the first user's device 302. Another user's device 306 also receives the introductory data packets from devices 302 and 304, as does an unknown device 308. As each user's introductory data packet is received by the other's device, the application validates (decodes/decrypts) the received packet, and displays some or all of the user profile included in the received introductory data packet in a "Nearby Users" section of the application (see FIG. 4). The displayed user profile preferably includes at least the other user's image and preferred language for communication, though it may include other details from the other user's user profile as well. Thus, each user can see at least a portion of the user profile of other nearby users, possibly allowing users to visually identify other users (as where one user sees someone nearby whose appearance corresponds to a displayed profile image).

A user can then use his/her device to initiate either a one-to-one conversation or a group conversation with other nearby users (bystanders) by selecting one or more of the displayed nearby bystanders, thereby sending a connection request to each selected bystander (i.e., a Bluetooth or other short-range wireless signal indicating that the user wishes to engage in further communications). Connection is established when the connection request is accepted by the bystander, and conversation (as described below) may begin. This process is partially illustrated in FIG. 4, which depicts the device screens of an English-speaking user and a Spanish-speaking bystander at 402 and 404, respectively. Their screens depict the image and profile information of other bystanders (including each other), with audio icons being visible next to those bystanders who have provided a brief audio introduction as a portion of their user profiles (which a user can play by tapping the icon). When the English-speaking user taps on the icon/listing 406 for the Spanish-speaking bystander, the pop-up window 408 at bottom left appears on the user's screen 402, asking the user to confirm whether a connection request is to be sent to the Spanish-speaking bystander. Once confirmed, the pop-up window 410 at bottom right appears on the bystander's screen 404, asking the bystander to indicate whether he/she wishes to accept the connection request. Once accepted, either of the user and the bystander can begin a conversation by sending a message to the other in text and/or audio format. The receiving bystander(s) can receive the message in text and/or audio format (the format being based on his/her chosen configuration).

Users have the option to update their status from "Available" to "Do Not Disturb" or "Unavailable." The "Do Not Disturb" status prevents others from joining the conversation (i.e., denies newly received connection requests), but allows the user to send requests to start a new conversation (i.e., to send new connection requests). The "Unavailable" status stops transmitting user availability (i.e., stops transmitting the user's introductory data packet, thereby halting display of the user's user profile on nearby devices and preventing other users from sending connection requests to the user). Users also have the option to selectively set their display status as "Available" only for certain selected user(s) based on information in their user profiles (e.g., male or female users, users in a certain age range, etc.). Here the payload of the user's transmitted introductory data packet includes availability data which instructs the bystanders' devices whether to display the user's profile to the bystanders.

Conversations may include messages in audio input mode and/or text input mode. In the audio input mode, a user may speak a message into his/her device, which may be heard and/or read by the bystander in the bystander's preferred language (i.e., the user's message is translated to the bystander's language, if needed). Preferably, the user's audio message is delivered to the bystander in the user's voice using voice cloning. This process is represented by selected steps shown in FIG. 2:

(1) The audio message (the words spoken by the user) are captured by the user's device at 202.

(2) At 204, the message is sent to a voice-to-text transcription engine, which converts the user's message into text in the primary language set in the user's user profile. The transcription engine may be any one or more of the following, or any other suitable voice-to-text application:

Google Speech API (Google, Mountain View, CA, US)
IBM Watson API (IBM, Armonk, NY, US)
Microsoft Azure (Microsoft, Redmond, WA, US)
Amazon Speech API (Amazon, Seattle, WA, US)
Nuance Speech API (Nuance, Burlington, MA, US)
Temi Transcription API (Temi, San Francisco, CA, US)
FF Transcription (Wayne, PA, US)
Rev.AI (Rev, San Francisco, CA, US)
TranscribeMe (Oakland, CA, US)
TakeNote (London, England, UK)
Wit.AI Speech API (Wit.AI, Palo Alto, CA, US)

(3) At 208, the transcribed text of the user's audio message is sent to a translation engine. The translation engine converts the transcribed text of the user's message into text in the preferred language set in the bystander's user profile. The translation engine may be any one or more of the following, or any other suitable translation application:

Google Translate (Google, Mountain View, CA, US)
Microsoft Translate (Microsoft, Redmond, WA, US)
IBM Watson (IBM, Armonk, NY, US)
Yandex Translate (Yandex, Moscow, RU)
Unabel (Lisbon, PT)
SysTran.io Translation API (Systran, Paris, FR)
Stepes (San Francisco, CA, US)
SmartLing (New York, NY, US)
Tilde (Riga, LV)
Straker Translations (Auckland, NZ)
Amazon Translate (Amazon, Seattle, WA, US)

(4) At 218, the text containing the user's message in the bystander's language is sent to a text-to-voice engine, converting the text to audio. The audio is preferably also processed by one or more of an accent translator engine (which accents the translated message to make it sound less machine-rendered and more human) and/or a voice cloning engine (which adjusts pitch, tone, accent, etc. to better match that of the user, thereby making the user's translated message sound as if it was actually spoken by the user). Many of the voice-to-text engines noted above also provide text-to-voice engines, and/or have built-in accent translator engines. Exemplary voice cloning engines that may be used include:

CereVoice Me (CereProc, Edinburgh, Scotland, UK)
ISpeech.org Voice Cloning (Speech, Newark, NJ, US)
Lyrebird (Lyrebird AI, Montréal, Québec, CA)
Resemble.AI (Resemble AI, Toronto, Ontario, CA)
Baidu Deep Voice (Baidu, Beijing, CN)

(5) At 220, the resulting audio message is sent to the bystander, thereby presenting the user's audible message (which was generated in the user's primary language) into an audible message in the bystander's language (and preferably in the user's voice).

The transcription engine, translation engine, text-to-voice engine, accent translator engine, and voice cloning engine may be on the user's device, but are preferably web-based or otherwise remotely accessed by the app (preferably by the user's app, but possibly at least partially by the bystander's app). The user may have the option to send the final audio message in real time (that is, to have the final audio message delivered as soon as the user's message has been fully processed), or may instead select to deliver the final audio message to the bystander after the user has a chance to review and approve it (e.g., by use of steps 206, 210, 212, 214, and 216 as described below).

In the text input mode, the user can type a text message to send to bystanders (at 202). The text message is then supplied to a translation engine (at 208) to generate text in the bystanders' preferred language(s), which may be delivered to the bystander (at 220) via the app. The translated message may be received by a bystander in text form and/or in audio form (by use of the aforementioned text-to-voice engine at 218) in accordance with the preferences set in the bystander's user profile.

Figure 5:
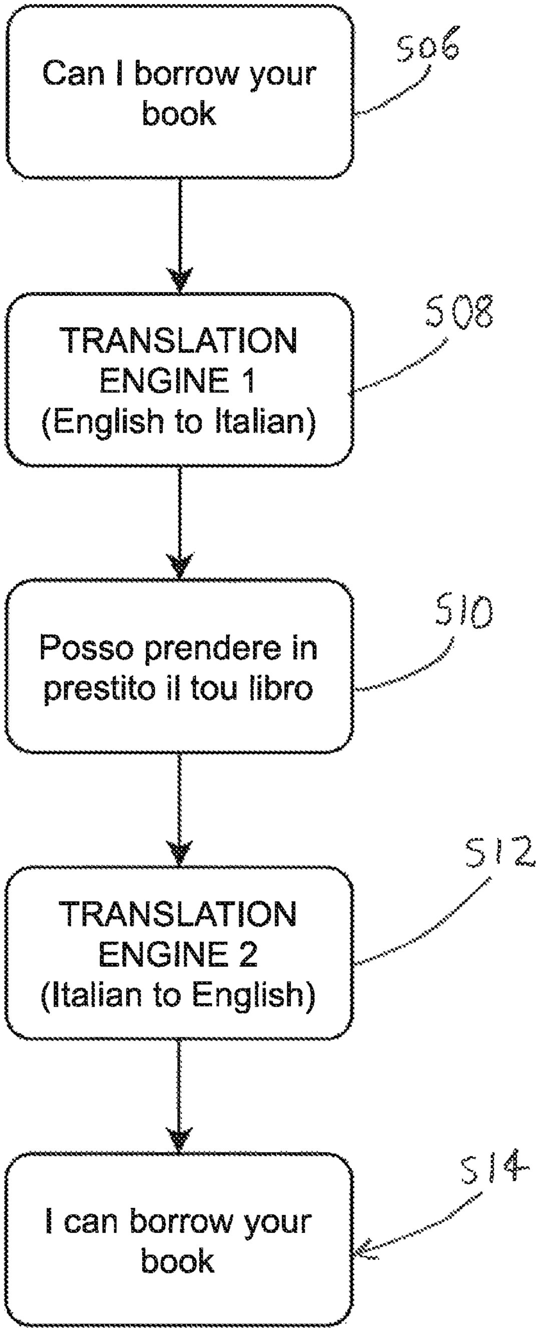
FIG. 5 illustrates an exemplary message 506 that might be entered by a user on the user's device, along with a corresponding translated message 510 and back-translated message 514.

Regardless of whether the user uses the audio input mode or the text input mode to input a message, the text of the user's typed or spoken message is preferably displayed to the user (at 206) along with the message back-translated into the user's preferred language after conversion to the bystander's language (at 214). Translation engines do not always translate in the desired or expected context, and thus displaying the user's message as originally entered and also as back-translated can help reduce errors and misunderstandings. An example is shown in FIG. 5. Here a user (whose primary language is English) seeks to send the message "can I borrow your book?" to a bystander whose preferred language is Italian. The user types this phrase, or otherwise speaks it (with the spoken phrase being converted to text), such that it is seen by the user at step 506 (206 in FIG. 2); the English phrase is converted to Italian at step 508 (208 in FIG. 2) via a translation engine (for actual or proposed delivery to the bystander); the Italian translation (at 510, or 210 in FIG. 2) is back-translated into English at step 512 (212 in FIG. 2) using the same translation engine, or preferably one or more different translation engines; and the back-translated English phrase of step 514 (214 in FIG. 2B) is displayed to the user along with the originally-entered English phrase. As seen in FIG. 5, the user intended to send the message "can I borrow your book," but the message as translated to Italian reads "I can borrow your book" because the lack of a question mark in the originally-entered message caused the translation engine to mistake the context of the message during translation. Providing the back-translated message to the user prior to delivery of the translated message allows the user to edit his/her message (e.g., add the question mark), as seen at step 216 of FIG. 2, thereby updating and possibly correcting the message prior to its delivery. As the user edits his/her originally-entered message, the translated and back-translated messages are updated, with the back-translated message being displayed to the user (at step 214 of FIG. 2, and step 514 of FIG. 5) for approval prior to delivery of the translated message to the bystander. The user can then send an approved message to the bystander in text and/or (preferably voice-cloned) audio form, preferably via the short-range communications protocol used for the aforementioned transmissions between the parties.

Figure 6A:
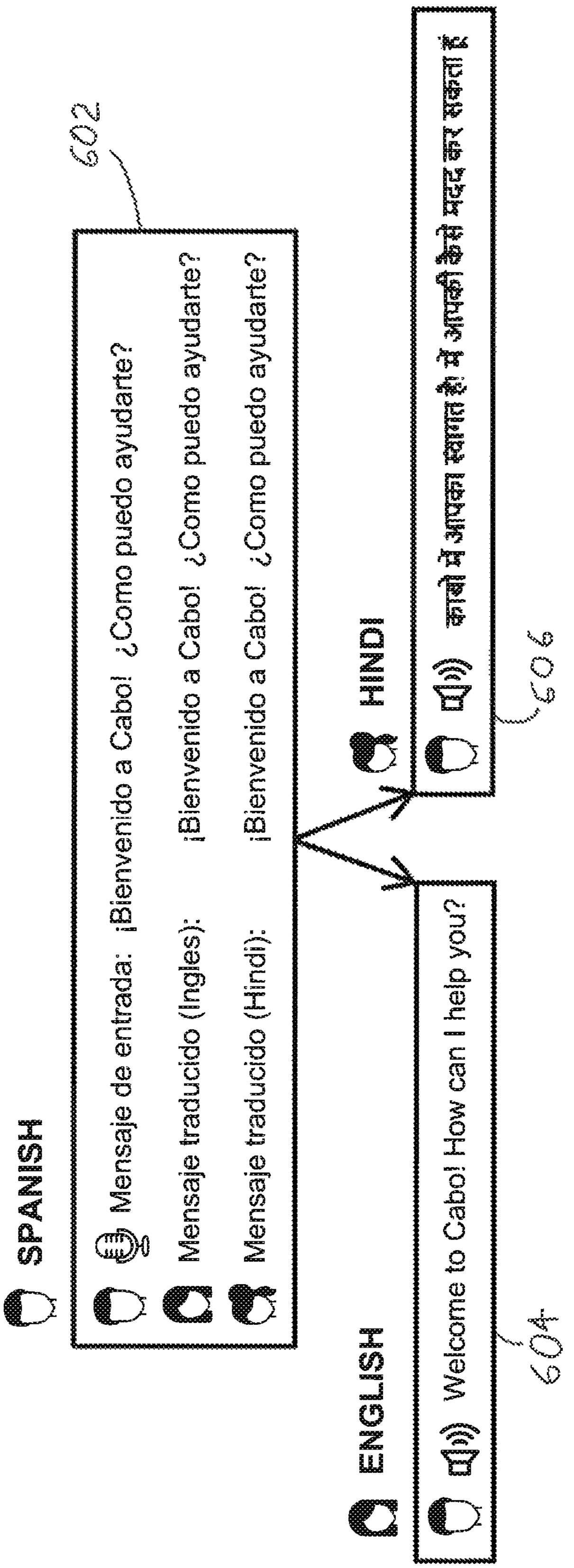
Figure 6C:
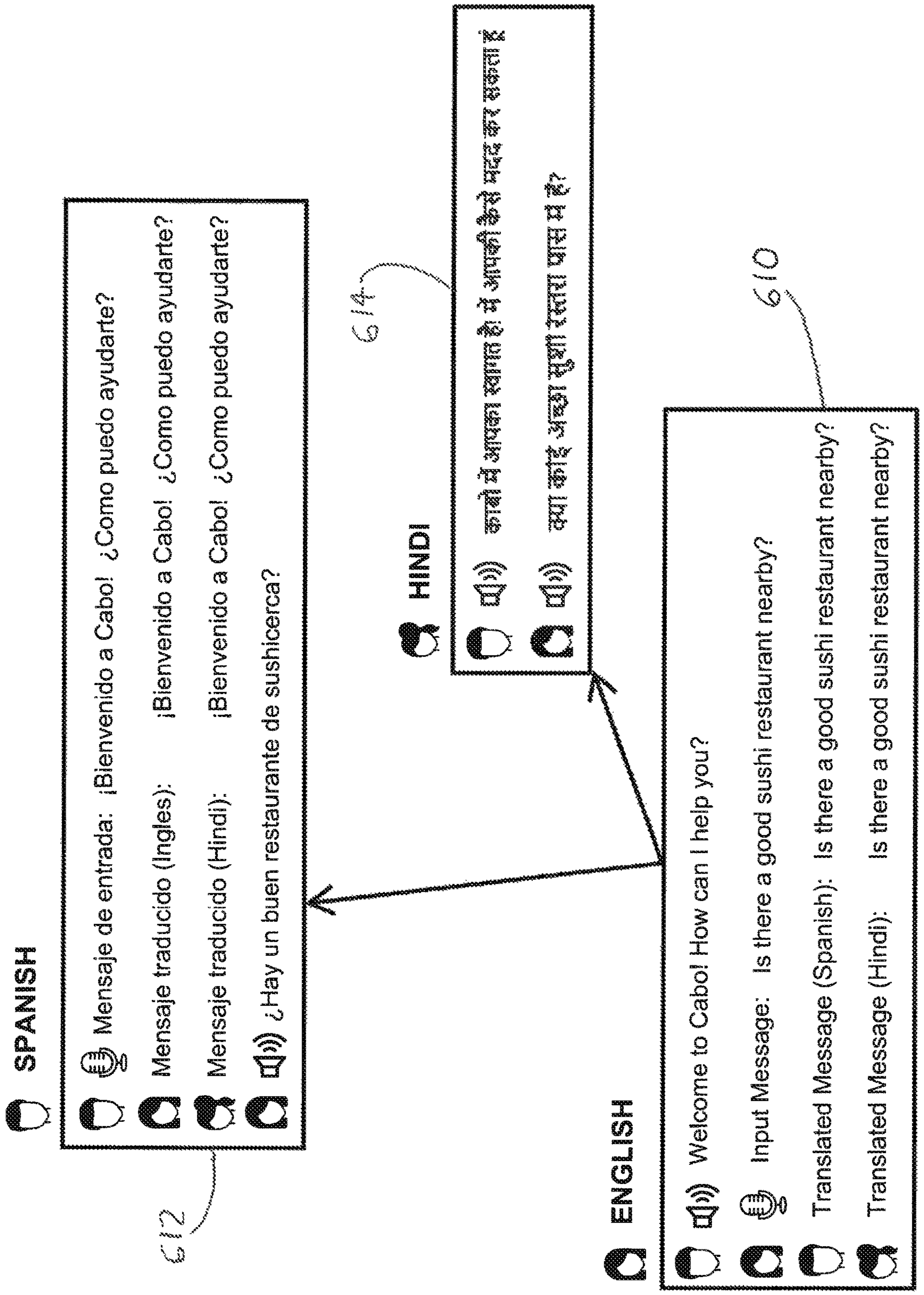

FIGS. 6*a*-6*c* show a group conversation between English, Spanish, and Hindi-speaking users/bystanders. In FIG. 6*a*, the Spanish-speaking user initiates the conversation at 602, with the user's entered Spanish-language message being displayed along with back-translated messages, and also showing the message (once approved and delivered) as received by the English-speaking bystander at 604 and by the Hindi-speaking bystander at 606. (As discussed above, the message may be entered and/or received in text and/or audio form, with a microphone icon being pressed for voice entry and a speaker icon being pressed for audio output.) In FIG. 6*b*, the English-speaking bystander enters an English reply message at 608 which contains a typographic error ("restuarant" rather than "restaurant"), along with returned back-translated messages. The Hindi back-translated message contains a translation of the error which can illustrate to the English-speaking bystander that his/her entered reply message may benefit from editing. FIG. 6*c* then illustrates the English-speaking bystander's edited reply message, along with its back-translated messages, at 610. The edited reply message (once approved and delivered) is shown as received by the Spanish-speaking bystander at 612, and by the Hindi-speaking bystander at 614.

Figure 1:
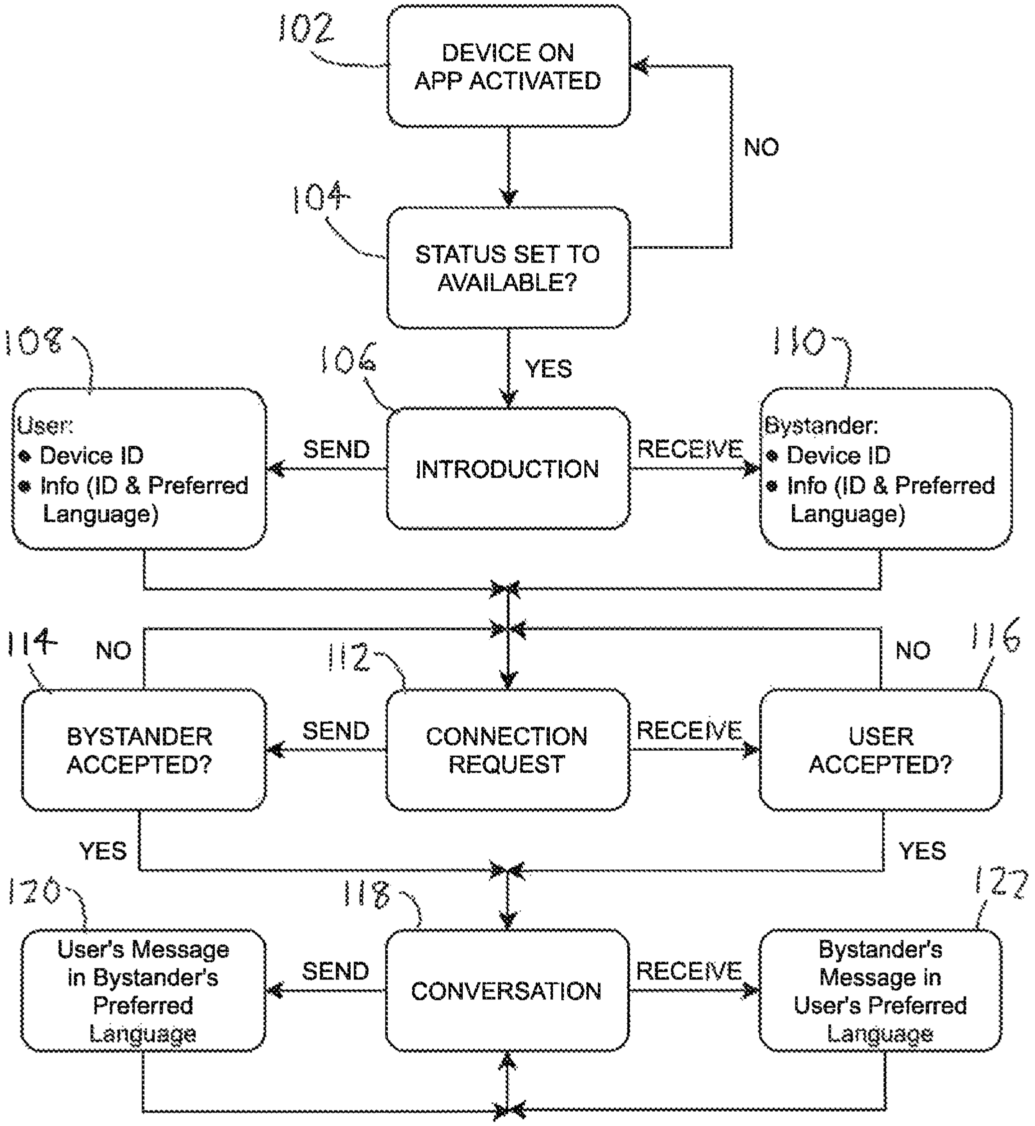
FIG. 1 is a flow diagram schematically illustrating the process by which a user makes introductions, connections, and conversations with bystanders.

FIG. 1 provides a simplified schematic view of a preferred version of the conversation process. A user activates the app at 102. Once the user sets his/her status to "available" at 104, the app is ready to make introductions at 106, and begins sending user introductions (introductory data packets) at 108, and also begins receiving bystander introductions (introductory data packets) from "available" bystanders at 110. (Alternatively, the user's app may begin receiving bystander introductions from "available" bystanders upon activation of the user's app, but will only begin sending user introductions once the user's status is set to "available.") The user and nearby bystanders within the transmission ranges of each other's devices are then visible to each other on their devices, preferably by at least their displayed images (as exemplified by FIG. 4). The app is then ready for connection requests 112, whereby the user can then select one or more bystanders to converse with (with the selected bystanders receiving a connection request from the user). Alternatively or additionally, the user may be selected by one or more bystanders for conversation, in which case the user receives a connection request from each such bystander.

Conversation 118 can then begin upon a bystander's acceptance 114 of the user's connection request, or upon the user's acceptance 116 of a bystander's connection request. The user can send messages to any or all bystanders who accepted the user's connection request(s), with the user's message (transcribed to text, if in audio format) being displayed to the messaging user as (1) the text of the user's entered message; (2) optionally the text translated into each of the connected bystanders' primary languages; and (3) the translated text(s) back-translated into the user's preferred language. The user may then edit any one or more of (1)-(3), with edits resulting in updates in the others of (1)-(3). Upon approval by the messaging user, the message is provided to the other connected users (at 120) in their preferred languages (in text and/or audio format). The bystander can likewise send messages to the user (and to any or all other bystanders who accepted the bystander's connection request(s)) in the same manner, at 122.

The exemplary version of the invention described above may optionally include any one or more of the following features.

Figure 2:
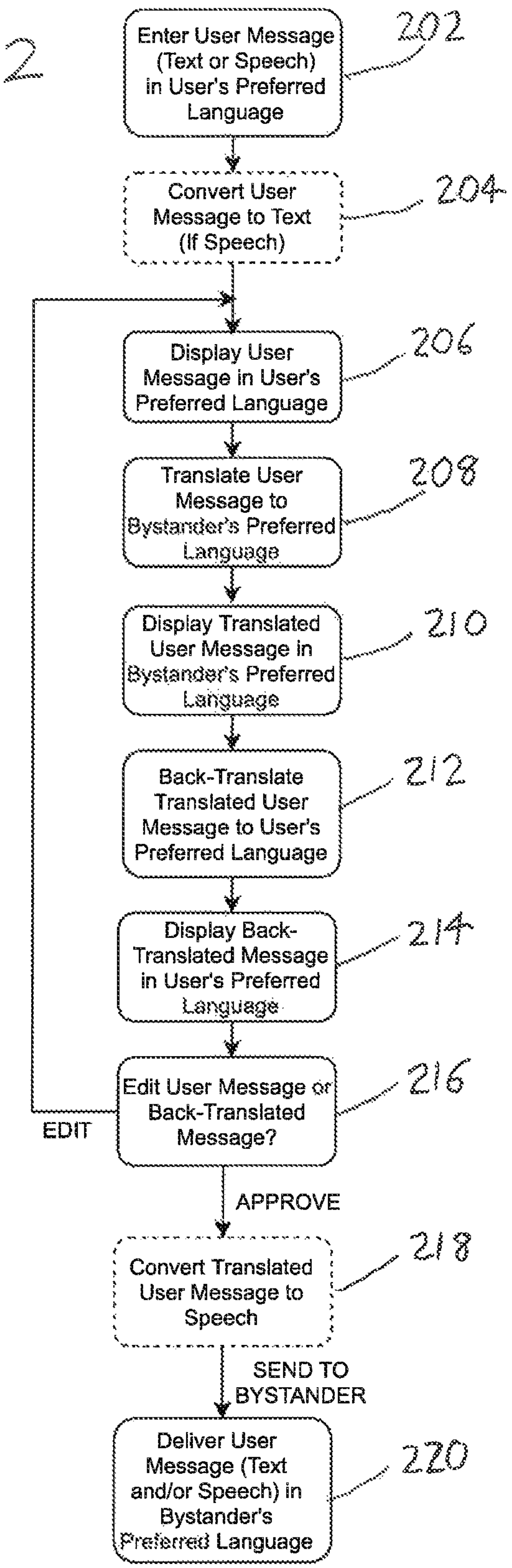
FIG. 2 is a flow diagram illustrating the process by which a message from the user is converted to a message to the bystander, with optional steps being bounded by phantom (broken) lines.

As an enhancement to the conversation steps shown in FIG. 2 and described above, the invention might display the user message "red-lined" versus the back-translated message, e.g., with text present in the original user message and absent from the back-translated message being shown underlined in the user message, and text present in the back-translated message and absent from the original user message being shown struck out in the user message. In this case, the back-translated message may not be independently shown, and might instead only be displayed embedded in the user message (via the struck text and the text shared with the user message).

As another modification to the conversation steps shown above, and illustrated in FIG. 2, a user may enter his/her user message in the user's preferred language, and (after any desired edits) may approve the message. If the approved user message matches the back-translated message(s) (which might not be displayed to the user), the translated user message(s) (which also might not be displayed to the user) may then automatically be transmitted to the corresponding bystander(s), at least for those bystanders for which the approved user message matches the back-translated message(s). However, for any back-translated message does not match the approved user message, the corresponding back-translated message (and possibly the corresponding translated user message) may be displayed to the user for review, editing, and approval/sending (with the back-translated message being displayed in its entirety independently of the user message, or embedded within the red-lined user message).

The invention can accommodate visually-impaired users by having their user profiles specify that all message delivery to the user is to occur by audio. If a connection request is sent from a bystander to such a user, the bystander may be prompted to record a brief audio description that will be included as part of the connection request (if such an description has not already been recorded). The user may then hear this description upon receipt of the connection request, preferably translated to the user's language as discussed above.

Conversations (both text and/or audio messages) can be saved by a user (preferably catalogued by bystander), tagged, searchable via keywords, and can be shared/distributed to other mediums such as email, social media, team spaces such as Slack, etc. (preferably accompanied by any additional matter specified by the user, such as photos/images, text, etc.).

As noted above, introductions, connection requests, and conversations (messages) are preferably sent via short-range wireless transmission protocols (which, for purposes of this document, should be regarded as protocols having ranges of 15 meters or less). This effectively limits communications to nearby users/bystanders. However, rather than limiting the app's use to short-range communications, the app could also or alternatively allow for long-range communications. Here the user might select bystanders from his/her SMS (short message service/text messaging), telephone, and/or email contact list(s), with introductions, connections, and conversations being delivered using SMS, cellular, and/or internet protocols rather than via short-range transmission protocols. The invention could also be implemented on social media platforms or other platforms where users converse with each other. Use of both short-range and long-range communication modes is also possible; for example, introductions and connection requests might be sent via short-range protocols, with conversations then occurring via long-range protocols.

The invention can also be used as a learning tool, by generating translated audio and/or text messages in a chosen language without initiating a conversation with another user. The generated messages can be stored for review and/or for later use (e.g., to send to recipient(s) during a subsequent conversation) or deleted.

Apart from stored messages of the type noted above, the app may generate and/or store "standard" messages, such as:

How much does this cost?
I have a food allergy
Where is the nearest hospital?
I am not feeling well
Is there a restaurant nearby?
Is there an ATM nearby?

These "standard" messages can be selected to send to recipient(s) during a conversation.

The invention is preferably able to access and configure various digital wallets (e.g., a digital wallet for cryptocurrency) to transfer funds to another user during a conversation.

The invention can incorporate a location-based currency converter, whereby any monetary amounts noted in a message (and which may be presumed to be in the user's "home currency" stated in the user's profile) are automatically converted to the local currency. The local currency can be set manually by a user, or updated automatically based on the location provided by any GPS (Global Positioning System) or other location service incorporated in the user's device.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A method for enabling multilingual communications between the computing device of a user and a computing device of one of more bystanders, the method including the steps of:

a. receiving upon the user's device information from a bystander's device concerning the bystander's preferred language;

b. performing the following message input steps on the user's device:

(1) accepting user input of a user message, the user message being displayed on a screen of the user's device, (2) translating the user message into a translated user message in the bystander's preferred language, (3) translating the translated user message into a back-translated message in the user's preferred language, the back-translated message being displayed on the screen of the user's device, (4) accepting any user edits to the back-translated user message without accepting any user edits to the user message, such user edits to any displayed back-translated user messages causing a repeat of message input steps (2) onward;

c. upon the user's device receiving the user's approval of the user message, transmitting the translated user message from the user's device to the bystander's device.

2. The method of claim 1 further including the step of displaying the translated user message on the screen of the user's device adjacent the user message and the back-translated user message.

3. The method of claim 1 further including the step of transmitting a user introductory data packet from the user's device, the user introductory data packet including:

a. a user packet header uniquely identifying the user's device, and b. a user profile encoding information concerning the user's identity and preferred language.

4. The method of claim 3 further including the steps of:

a. receiving upon the user's device a bystander introductory data packet which includes:

(1) a bystander packet header uniquely identifying the bystander's device, and (2) a bystander profile encoding information concerning the bystander's identity and preferred language, b. displaying on the user's device at least a portion of the information concerning the bystander's identity.

5. The method of claim 4 wherein the displayed information concerning the bystander's identity includes an image of the bystander.

6. The method of claim 5 wherein the displayed information concerning the bystander's identity further includes the age of the image of the bystander.

7. The method of claim 4:

a. further including the following steps after display of at least a portion of the information concerning the bystander's identity on the user's device:

(1) on the user's device, permitting user selection of the bystander corresponding to the displayed information, (2) upon user selection of the bystander, transmitting a connection request from the user's device to the bystander's device, b. wherein the message input steps are performed on the user's device upon the user's device's receiving acceptance of the connection request from the bystander.

8. A system for enabling multilingual communications between the computing device of a user and a computing device of one of more bystanders, the system being configured to perform the steps of:

a. transmitting a user introductory data packet from the user's device to the bystander's device, the introductory data packet including:

(1) a user packet header uniquely identifying the user's device, and (2) a user profile encoding information concerning the user's preferred language, b. upon the user's acceptance of a connection request from the bystander, performing the following message input steps on the user's device:

(1) accepting user input of a user message, the user message being displayed on the screen of the user's device, (2) translating the user message into a translated user message in the bystander's preferred language, (3) translating the translated user message into a back-translated message in the user's preferred language, (4) if the back-translated message matches the user message, automatically transmitting the translated user message to the bystander's device upon generation of the back-translated message, (5) if the back-translated message does not match the user message, displaying the back-translated user message adjacent the user message on the screen of the user's device, (6) accepting any user edits to the displayed back-translated user message without accepting any user edits to the user message, such user edits to the displayed back-translated user message causing a repeat of message input steps (2) onward.

9. The system of claim 8 further being configured to perform the steps of:

a. accepting via the user's device any edits of at least one of:

(a) the user message, and (b) any displayed back-translated user message, b. translating any edited message from the user's preferred language to the bystander's preferred language, thereby generating an updated translated user message, c. upon the user's device receiving the user's approval of the translated user message, transmitting the translated message to the bystander's device.

10. The system of claim 8 wherein the translated user message is displayed on the screen of the user's device adjacent the user message and the back-translated user message.

11. The system of claim 8 further being configured to perform the steps of:

a. receiving upon the user's device a bystander introductory data packet which includes:

(1) a bystander packet header uniquely identifying the bystander's device, and (2) a bystander profile encoding information concerning the bystander's identity and preferred language, b. displaying on the user's device at least a portion of the information concerning the bystander's identity, c. on the user's device, permitting user acceptance of the connection request from the bystander.

12. The system of claim 11 wherein the bystander introductory data packet corresponds to a bystander whose device received the user introductory data packet.

13. The system of claim 11 wherein the displayed information concerning the bystander's identity includes an image of the bystander.

14. The system of claim 13 wherein the displayed information concerning the bystander's identity further includes the age of the image of the bystander.

15. A method for enabling multilingual communications between the computing device of a user and a computing device of one of more bystanders, the method including the steps of:

a. receiving upon the user's device one or more bystander introductory data packets, each bystander introductory data packet:

(1) corresponding to a unique bystander, and (2) including a bystander profile encoding information concerning the bystander's identity and preferred language, b. for each bystander introductory data packet received upon the user's device, displaying on the user's device at least a portion of the corresponding information concerning the bystander's identity, c. on the user's device, permitting user selection of one or more bystanders corresponding to the displayed information concerning the bystander's identity, d. upon user selection of the one or more bystanders, transmitting a connection request from the user's device to each selected bystander, e. upon the device's receiving acceptance of the connection request from one or more of the bystanders, performing the following message input steps on the user's device:

(1) accepting user input of a user message, the user message being displayed on a screen of the user's device, (2) translating the user message into one or more translated user messages, each translated user message being in the preferred language of a respective one of the selected bystanders, (3) translating each of the translated user messages into a respective back-translated message in the user's preferred language, wherein any back-translated messages that do not match the user message are displayed on the screen of the user's device, (4) accepting any user edits to any displayed back-translated user messages without accepting any user edits to the user messages, such user edits to any displayed back-translated user messages causing a repeat of message input steps (2) onward;

f. upon the device's receiving acceptance of the user message from the user, transmitting from the device each of the translated user messages to its respective bystander.

16. The method of claim 15 further including the step of displaying the translated user messages on the screen of the user's device adjacent the user message and any displayed back-translated user messages.

17. The method of claim 15 further including the step of transmitting a user introductory data packet from the user's device prior to permitting user selection of one or more bystanders corresponding to the displayed information concerning the bystander's identity, the user introductory data packet including:

a. a user packet header uniquely identifying the user's device, and b. a user profile encoding information concerning the user's identity and preferred language.

18. The method of claim 17 wherein the displayed information concerning the bystander's identity includes an image of the bystander.

19. The method of claim 18 wherein the displayed information concerning the bystander's identity further includes the age of the image of the bystander.

20. The method of claim 15 wherein:

a. the reception of the bystander introductory data packets, b. the transmission of the connection request, and c. the transmission of the translated user messages, occur via a short-range wireless communications protocol.

* * * * *